US009630532B2

(12) United States Patent
Schnell et al.

(10) Patent No.: US 9,630,532 B2
(45) Date of Patent: Apr. 25, 2017

(54) PNEUMATIC ELEMENT

(71) Applicant: Continental Automotive GmbH, Hannover (DE)

(72) Inventors: Michael Schnell, Ingolstadt (DE); Andreas Foistner, Thalmässing (DE); Markus Prexl, Schierling (DE); Bernd Seggewiβ, Ingolstadt (DE)

(73) Assignee: Continental Automotive GmbH, Hanover (DE)

( * ) Notice: Subject to any disclaimer, the term of this patent is extended or adjusted under 35 U.S.C. 154(b) by 0 days.

(21) Appl. No.: 14/434,475

(22) PCT Filed: Oct. 10, 2013

(86) PCT No.: PCT/EP2013/071175
§ 371 (c)(1),
(2) Date: Apr. 9, 2015

(87) PCT Pub. No.: WO2014/057041
PCT Pub. Date: Apr. 17, 2014

(65) Prior Publication Data
US 2015/0251572 A1    Sep. 10, 2015

(30) Foreign Application Priority Data
Oct. 10, 2012  (DE) ................. 10 2012 218 440

(51) Int. Cl.
*B60N 2/44* (2006.01)
*B60N 2/70* (2006.01)
*F16K 15/20* (2006.01)

(52) U.S. Cl.
CPC ......... *B60N 2/4415* (2013.01); *B60N 2/7082* (2013.01); *F16K 15/20* (2013.01); *Y10S 297/03* (2013.01); *Y10T 137/3584* (2015.04)

(58) Field of Classification Search
CPC .... B60N 2/4415; B60N 2/448; B60N 2/7082; B60N 2/7088; Y10S 297/03
(Continued)

(56) References Cited

U.S. PATENT DOCUMENTS 3,251,077 A * 5/1966 Beckman ................ A47C 4/54
                                                          267/117
3,261,037 A * 7/1966 Cermak ................... A47C 4/54
                                                          267/105
(Continued)

FOREIGN PATENT DOCUMENTS

CN        1541168         10/2004
CN        1668491          9/2005
(Continued)

OTHER PUBLICATIONS

International Search Report for International Application No. PCT/EP2013/071175 mailed Dec. 11, 2013.
(Continued)

*Primary Examiner* — Ryan Kwiecinski
(74) *Attorney, Agent, or Firm* — RatnerPrestia

(57) ABSTRACT

A pneumatic element including: a first, a second, and a third air chamber which are coupled to one another, the first air chamber being coupled to the second air chamber by a weld joint and the second air chamber being coupled to the third air chamber by another weld joint; and an overflow area, which is arranged within the weld joints along a longitudinal axis of the pneumatic element, for a pneumatic communication between the air chambers. Each of the air chambers has a first state in which a pressure inside the air chambers corresponds to a pressure outside of the air chambers and a second state in which the pressure inside the air chambers is greater than the pressure outside of the air chambers. Furthermore, a flow opening is provided for a pneumatic
(Continued)

communication between the overflow region and the second air chamber in the first state.

10 Claims, 2 Drawing Sheets

(58) Field of Classification Search
USPC ... 297/180.1, 216.13, 216.14, 284.6, DIG. 3, 297/DIG. 8
See application file for complete search history.

(56) References Cited

U.S. PATENT DOCUMENTS

| | | | | |
|---|---|---|---|---|
| 3,765,038 | A * | 10/1973 | Curtis | A47C 7/24 297/452.51 |
| 4,538,854 | A * | 9/1985 | Wilson | A47C 3/30 297/344.2 |
| 4,629,253 | A * | 12/1986 | Williams | B60N 2/00 297/284.1 |
| 5,082,326 | A | 1/1992 | Sekido | |
| 5,607,749 | A * | 3/1997 | Strumor | A43B 7/146 297/DIG. 8 |
| 7,052,090 | B2 | 5/2006 | Leutert | |
| 7,234,763 | B2 | 6/2007 | Gupta | |
| 8,136,834 | B2 * | 3/2012 | Fredriksson | B60R 21/207 280/730.2 |
| 2006/0217644 | A1 * | 9/2006 | Ozaki | A61H 9/0078 601/148 |
| 2010/0231016 | A1 | 9/2010 | Volz | |
| 2015/0126916 | A1 * | 5/2015 | Hall | B60N 2/448 601/149 |

FOREIGN PATENT DOCUMENTS

| | | | | |
|---|---|---|---|---|
| CN | 101837750 | | 9/2010 | |
| DE | 4013679 | | 11/1990 | |
| DE | 102011017238 | | 12/2011 | |
| DE | 202011109531 | U1 * | 2/2012 | ............. B60N 2/448 |
| DE | 102011010209 | | 8/2012 | |
| DE | WO 2012103910 | A1 * | 8/2012 | ........... B60N 2/4415 |
| DE | 102012014683 | A1 * | 1/2014 | ............. B29C 44/18 |
| DE | 102012215301 | A1 * | 3/2014 | ........... B60N 2/4415 |
| DE | WO 2014037071 | A1 * | 3/2014 | ........... B60N 2/4235 |
| FR | 2572034 | A1 * | 4/1986 | ............. B60N 2/502 |
| JP | 2007253981 | | 10/2007 | |

OTHER PUBLICATIONS

German Examination Report for German Application No. 10 2012 218 440.6 mailed May 27, 2013.
Chinese Office Action dated Mar. 4, 2016 for Chinese Application No. 201380053052.9, including translation, 15 pages.

* cited by examiner

PNEUMATIC ELEMENT

CROSS REFERENCE TO RELATED APPLICATIONS

This application is the U.S. National Phase Application of PCT International Application No. PCT/EP2013/071175, filed Oct. 10, 2013, which claims priority to German Patent Application No. 10 2012 218 440.6, filed Oct. 10, 2012, the contents of such applications being incorporated by reference herein.

FIELD OF THE INVENTION

The invention relates to a pneumatic element, in particular a pneumatic element for a vehicle seat of a motor vehicle.

BACKGROUND OF THE INVENTION

Vehicle seats of motor vehicles have, for example, a seat surface and a backrest, both of which, by means of upholstery elements and spring systems, have a predetermined seat contour. The vehicle seats can be provided with one or more pneumatic elements which, via a control system and by means of a pressure generator, enable adaptation of the seat contour to a respective driver to be optimized. In addition, a massage function is possible by means of the pneumatic elements.

SUMMARY OF THE INVENTION

It is desirable to provide a pneumatic element which permits reliable and quiet operation.

According to an embodiment of the invention, a pneumatic element comprises a first, a second and a third air chamber. The air chambers are coupled to one another. The first air chamber is coupled to the second air chamber by means of a weld joint. The second air chamber is coupled to the third air chamber by means of a further weld joint. The pneumatic element comprises an overflow area which is arranged within the weld joints along a longitudinal axis of the pneumatic element. Pneumatic communication between the air chambers is possible by means of the overflow area. The air chambers each have a first state in which a pressure in the interior of the air chambers corresponds to a pressure outside the air chambers. The air chambers each have a second state in which the pressure in the interior of the air chambers is greater than the pressure outside the air chambers. The pneumatic element has a flow opening for pneumatic communication between the overflow area and the second air chamber in the first state.

Reliable pneumatic communication between the overflow area and the second air chamber, in particular in the first state, is possible by means of the flow opening. As a result, uniform filling of the first, second and third air chamber is possible. Quiet filling of the three air chambers is thereby possible.

In the first state, the air chambers are in particular emptied. In the first state, the air chambers are each vented. In the first state, it is possible for the films from which the air chambers are formed to be in contact with one another, in particular in an area adjacent to the overflow area. As a result, it is customarily possible for the films of the second air chamber, when said films are in contact with one another, to have prevented pneumatic communication between the overflow area and the second air chamber. If, for example, the air for the pneumatic element is injected into the first air chamber via a tube, customarily only the first and the third air chambers are filled with air since the pneumatic communication with the second air chamber is interrupted. Only above a certain pressure within the first and third air chambers relative to the ambient pressure do the films of the second air chamber customarily become detached from one another, and this may be associated with a production of noise within the range of 50 dBA.

According to an aspect of the invention, the pneumatic communication between the overflow area and the second air chamber is reliably possible in every state by means of the flow opening. The overflow opening prevents contact between the films of the second air chamber, which contact would prevent the pneumatic communication. The pressure within the three air chambers is therefore substantially identical. A pressure difference between the first air chamber and the second air chamber, which pressure difference would lead to a production of noise when the pneumatic element is inflated above a predetermined value for the production of noise, is therefore avoided. For example, the predetermined value for the production of noise, which value should not be exceeded, is 35 dBA.

According to embodiments, the flow opening is realized by a predetermined shape or a predetermined profile of the weld joint and of the further weld joint. The weld joint and the further weld joint are formed in such a manner that the films of the second air chamber are not completely in contact with one another circumferentially around the overflow area when the pneumatic element is vented.

According to embodiments, at least one weld joint of the weld joint and of the further weld joint has a profile which, transversely with respect to the longitudinal axis, has at least two different spacings from the longitudinal axis. As a result, the flow opening is formed in the first state. The profile of the at least one weld joint, which profile has at least two different spacings from the longitudinal axis, prevents the films of the second air chamber from being in contact with one another in the first state in such a manner that the pneumatic communication between the overflow area and the second air chamber is prevented. The profile which has at least two different spacings from the longitudinal axis results in cushion-shaped stamped formations by displacement of material during the welding operation. In the first state, when the air chambers are vented, the films are supported on said stamped formations. The overflow opening is thereby formed. The profile of the at least one weld joint is, for example, cross-shaped. According to further embodiments, the profile of the further weld joint is star-shaped. The profile of the at least one weld joint can also have a different shape and said profile has at least two differing spacings from the longitudinal axis of the pneumatic element.

According to further embodiments, the profile of the weld joint transversely with respect to the longitudinal axis differs from the profile of the further weld joint transversely with respect to the longitudinal axis. A different profile of the two weld joints prevents the films of the second air chamber from being in contact with one another around the complete circumference of the overflow area and preventing the inflow of air into the second air chamber. The flow opening is therefore formed.

The weld joints each have, for example, a circular profile, wherein the radius of the profile of the weld joint differs from the radius of the profile of the further weld joint. According to further embodiments, the weld joint has a cross-shaped profile and the further weld joint has a circular profile. As a result, the flow opening is formed when the second air chamber is vented.

According to further embodiments, the weld joint has a profile in the direction of the longitudinal axis and the further weld joint has a profile likewise in the direction of the longitudinal axis. The profile of the weld joint in the direction of the longitudinal axis differs from the profile of the further weld joint in the direction of the longitudinal axis in order to form the flow opening. For example, an elevation is stamped into the weld joint in order to form the flow opening. The elevation avoids the films of the second air chamber from being in contact completely circumferentially.

BRIEF DESCRIPTION OF THE DRAWINGS

Further advantages, features and developments emerge from the examples explained below in conjunction with the figures. Identical, similar and identically acting elements can be provided here with the same reference signs.

In the drawing.

DETAILED DESCRIPTION OF THE PREFERRED EMBODIMENTS

Figure 1A:
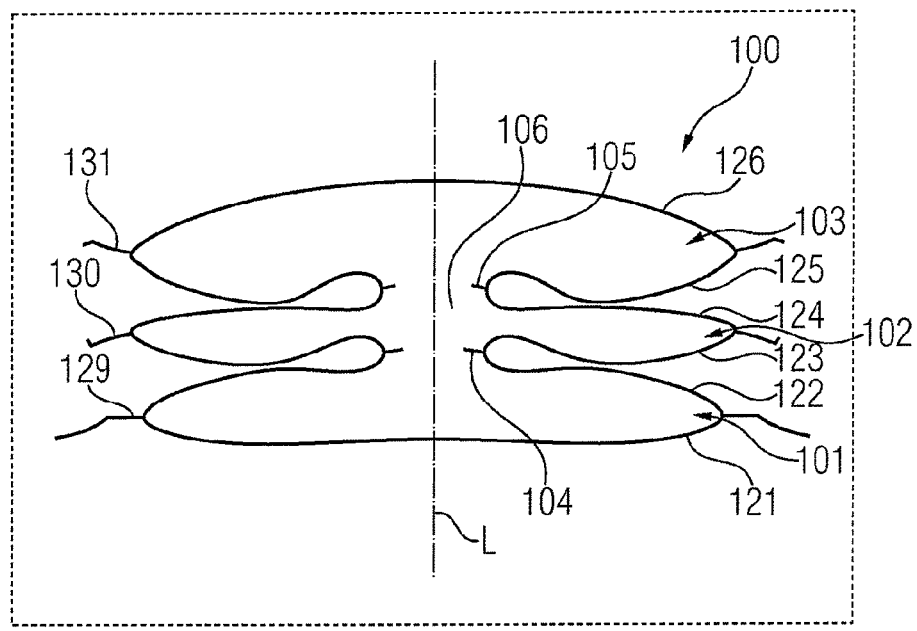
FIGS. 1A and 1B show a schematic illustration of a pneumatic element in different states according to an embodiment.
Figure 1B:
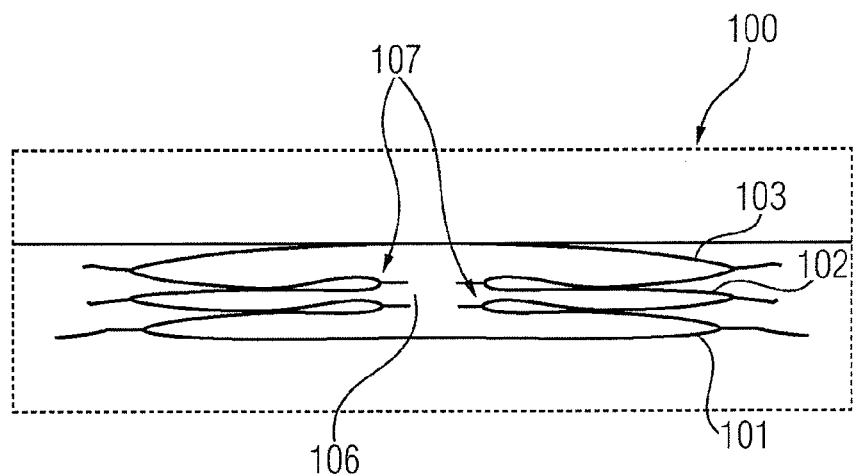

FIGS. 1A and 1B show a pneumatic element 100. FIG. 1A shows the pneumatic element 100 in a second state, in which the pneumatic element 100 is inflated, and therefore the pressure within the pneumatic element 100 is greater than the ambient pressure. FIG. 1B shows the pneumatic element 100 in a first state, in which the pneumatic element 100 is vented and the pressure in the interior of the pneumatic element 100 approximately corresponds to the pressure outside the pneumatic element 100.

The pneumatic element 100 is particularly arranged in a seat of a motor vehicle. The seat has, for example, a plurality of pneumatic elements 100. The pneumatic elements 100 are in particular arranged in the seat surface and the backrest of the seat. Individual adaptation of the seat to the occupant and a high level of comfort, in particular during long-distance trips of the vehicle, can be achieved by means of the pneumatic elements 100. Furthermore, massage functions can be realized by means of the pneumatic element 100, in the region of the seat surface and in the region of the backrest.

The pneumatic element 100 can be filled with a fluid by means of a fluid supply unit or emptied from the fluid. The fluid is in particular gaseous, preferably air. The fluid supply unit is in particular a compressor. In order to adapt the seat to the occupant and for the massage functions, the pneumatic elements 100 are filled with air by the compressor or emptied. In particular, the pneumatic elements 100 are filled and emptied differently. The filling and emptying are controlled by a control unit in which various massage programs are stored.

The pneumatic element 100 has a first air chamber 101, a second air chamber 102 and a third air chamber 103. The second air chamber 102 is arranged between the first air chamber 101 and the third air chamber 103 along a longitudinal axis L. The three air chambers 101 to 103 are coupled to one another in such a manner that pneumatic communication between the three air chambers 101 to 103 is possible. In particular, an overflow area 106 permitting pneumatic communication between the air chambers 101 to 103 is formed along the longitudinal axis L. According to further embodiments, the pneumatic element 100 has more than three air chambers which have a common overflow area 106.

In order to produce the pneumatic element 100, a first film 121 is welded to a second film 122, and therefore, at an outer area facing away from the longitudinal axis L, a weld joint 129 is formed between the first film 121 and the second film 122. The first air chamber 101 is formed by the first film 121 and the second film 122. The second air chamber 102 is formed comparably to the first air chamber 101 by welding a third film 123 and a fourth film 124 to form the weld joint 130. In a comparable manner thereto, the third air chamber 103 is formed by the weld joint 131 of a fifth film 125 to a sixth film 126. The second air chamber 102 is coupled to the first air chamber 101 by a weld joint 104. The weld joint 104 in particular connects the second film 122 to the third film 123. The weld joint 104 is arranged at an inner area, facing the longitudinal axis L, of the second film 122 and the third film 123. The second air chamber 102 is coupled to the third air chamber 103 by means of a weld joint 105. The weld joint 105 in particular connects the fourth film 124 to the fifth film 125. The weld joint 105 is arranged at an inner end of the fourth film 124 and of the fifth film 125, which end faces the longitudinal axis L. The sequence of the production of the weld joints 104, 105 and 129 to 131 does not inevitably correspond here to the sequence listed. For example, the weld joints 104 and 105 are formed first, followed by the weld joints 129, 130 and 131.

The pneumatic element 100 is coupled to a tube in order to fill or to vent the pneumatic element 100. In particular, the tube is arranged on the first air chamber 101. In order to fill the air chamber 101, air is therefore first of all pumped into the air chamber 101, wherein said air is distributed uniformly in the three air chambers 101 to 103 via the overflow area 106.

In the vented state, as illustrated, for example, in FIG. 1B, a flow opening 107 permits the reliable filling of the second air chamber 102. The flow opening 107 is arranged in the area of the weld joints 104 and 105 and permits pneumatic communication between the second air chamber 102 and the overflow area 106. According to the embodiment, there is arranged a single flow opening 107. According to further embodiments, a plurality of flow openings 107 are provided.

The flow opening 107 prevents contact of the third film 123 with the fourth film 124 around the complete circumference of the overflow area 106. The flow opening 107 in particular prevents the third film 123 and the fourth film 124 being pressed against each other next to the weld joints 104 and 105 in such a manner that pneumatic communication between the overflow area 106 and the second air chamber 102 is prevented.

The flow opening 107 is realized in particular by a predetermined profile of the weld joint 105 around the overflow area 106 transversely with respect to the longitudinal axis L. The flow opening 107 is realized in particular by a predetermined profile of the weld joint 104 about the overflow area 106 transversely with respect to the longitudinal axis L.

Figure 2:
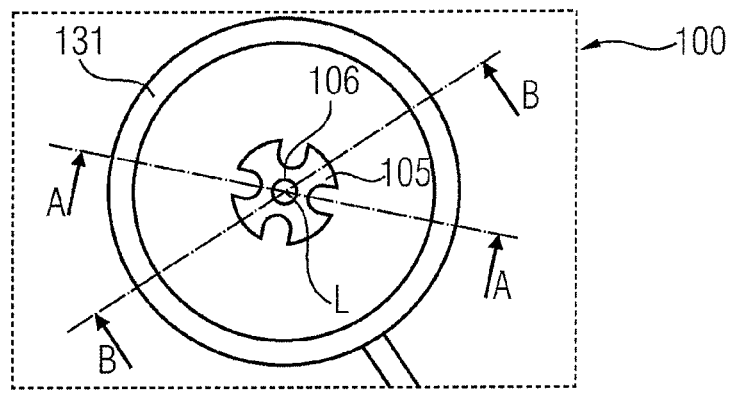
FIG. 2 shows a schematic illustration of a pneumatic element according to an embodiment.

FIG. 2 shows the pneumatic element 100 in a top view together with the profile of the weld joint 105 according to embodiments. The profile of the weld joint 105 in each case has a smaller spacing along the straight line AA from the longitudinal axis L than along the straight line BB. A cross shape of the weld joint 105 is thus realized, for example.

FIG. 3 shows the cross shape of the pneumatic element 100 schematically. The weld seam 105 has four areas 111, 113, 115 and 117 which each have a first spacing 119 from the longitudinal axis L. A further area of the areas 112, 114, 116 and 118, which each have a second spacing 120 from the longitudinal axis L, is arranged between every two areas of the areas 111, 113, 115 and 117. The spacing 119 is greater than the spacing 120. An area with a greater spacing 119 and an area with a smaller spacing 120 therefore always alternate with each other.

Figure 3A:
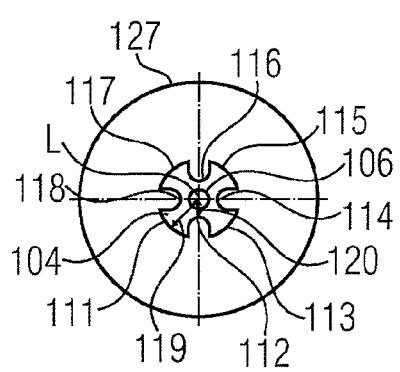
FIGS. 3A and 3B show a schematic illustration of sectional views of a pneumatic element according to an embodiment.
Figure 3B:
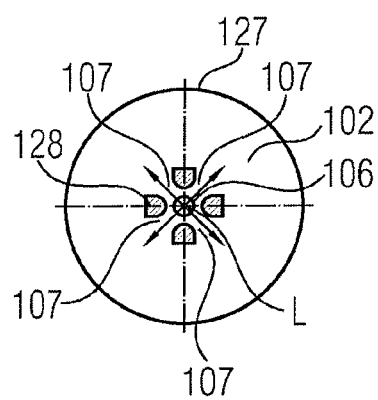

FIG. 3B schematically shows supporting areas 128 in which the third film 123 and the fourth film 124 are in contact in the first state when the weld joint 105 is formed as in FIG. 3A. Four flow openings 107 are formed between the supporting areas 128, said flow openings ensuring pneumatic communication between the overflow area 106 and the second air chamber 102.

A contour 127 of the pneumatic element 100 is illustrated in circular form in FIGS. 3A and 3B.

By means of the cross-shaped weld joint 104, it is ensured that, when the pneumatic element 100 is being inflated even under load, for example by the loading of the seat covering of the seat or by the weight of the occupant, the air can flow freely into all three chambers 101 to 103. In the areas 112, 114, 116 and 118 having the smaller spacing 120, cushion-shaped stamped formations are produced by displacements of material when the films 122 and 123 or 124 and 125 are welded together. As a result, the flow openings 107 form between the film 123 and the film 124, even if the pneumatic element 100 is compressed along the longitudinal axis L.

According to further embodiments, the weld joints 104 and 105 each have a different profile. The weld joints 104 and 105 each have a profile such that at least one flow opening 107 is formed between the film 123 and the film 124. For example, at least one of the weld joints 104 and 105 is stamped in such a manner that said weld joint has an elevation along the longitudinal axis 105, said elevation forming the flow opening 107. According to further embodiments, the weld joints 104 and 105 have profiles which differ from each other, as a result of which the flow opening 107 is formed. For example, the weld joint 104 has a cross shape and the weld joint 105 has a circular shape. According to further embodiments, the weld joints 104 and 105 have a different spacing from the longitudinal axis transversely with respect to the longitudinal axis. For example, the two weld joints 104 and 105 have a circular shape, but the radius of the circular shape of the weld joint 104 differs from the radius of the weld joint 105. Instead of the cross shape as explained in conjunction with FIGS. 2 and 3A, other profiles of the weld joints 104 and 105 are also possible in order to form the flow opening 107. In particular, the profiles of the weld joints 104 and 105 each have at least two mutually differing spacings from the longitudinal axis L.

Figure 4:
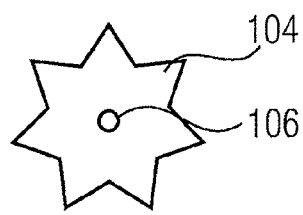
FIG. 4 shows a schematic illustration of a profile of a weld joint according to an embodiment.

FIG. 4 shows, for example, a star-shaped profile of the weld joint 104. In a comparable manner to the cross-shaped structure, areas of the profile having a greater spacing alternate with areas having a smaller spacing from the longitudinal axis L.

Figure 5:
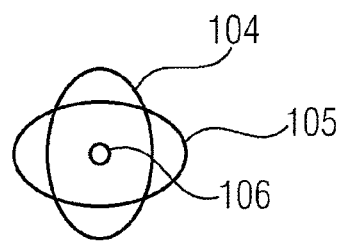
FIG. 5 shows a schematic illustration of a profile of weld joints according to an embodiment.

FIG. 5 shows an example of non-congruent profiles of the weld joints 104 and 105. The flow opening 107 is formed by the fact that the profiles of the weld joints 104 and 105 have areas which, in top view, differ from the profile of the other weld joint in each case.

The weld joints 104 and 105 each have a profile, and therefore the flow opening 107 is formed and hence a closed contact between the two films 123 and 124 is prevented. As a result, the air can flow unobstructed into all of the chambers 101, 102 and 103 during the inflation operation.

LIST OF REFERENCE SIGNS

100 pneumatic element
101, 102, 103 air chamber
104, 105 weld joint
106 overflow area
L longitudinal axis
107 flow opening
111 first area
112 second area
113 third area
114 fourth area
115 fifth area
116 sixth area
117 seventh area
118 eighth area
119 first spacing
120 second spacing
121-126 films
127 contour
128 supporting area
129, 130, 131 weld joint

The invention claimed is:

1. A pneumatic element for a vehicle seat of a motor vehicle, comprising:
    a first, a second and a third air chamber, which are coupled to one another, wherein the first air chamber is coupled to the second air chamber by means of a weld joint surrounding a first opening having a first shape, and the second air chamber is coupled to the third air chamber by a further weld joint surrounding a second opening having a second shape,
    an overflow area, which is arranged within the weld joints along a longitudinal axis of the pneumatic element, for pneumatic communication between the first, second, and third air chambers,
    wherein the first, second, and third air chambers each have a first state in which a pressure in the interior of the first, second, and third air chambers corresponds to a pressure outside the first, second, and third air chambers, and have a second state in which the pressure in the Interior of the first, second, and third air chambers is greater than the pressure outside the first, second, and third air chambers,
    a flow opening for pneumatic communication between the overflow area and the second air chamber in the first state, and
    at least one of the first and second shades of the openings has a profile which, transversely with respect to the longitudinal axis, has at least two different spacings from the longitudinal axis relative to a profile of the other one of the first and second shapes of the openings in order to form the flow opening.

2. The pneumatic element as claimed in claim 1, in which the profile of one of the first and second shapes is star-shaped.

3. The pneumatic element as claimed in claim 1, in which the profile of one of the first and second shades is cross-shaped.

4. The pneumatic element as claimed in claim 1, in which one of the first and second shades has a profile in the direction of the longitudinal axis and another one of the first and second shapes has a profile in the direction of the longitudinal axis, and the profile of the one of the first and second shapes in the direction of the longitudinal axis differs from the profile of the other one of the first and second shapes in the direction of the longitudinal axis in order to form the flow opening.

5. A pneumatic element for a vehicle seat of a motor vehicle, comprising:
   a first, a second and a third air chamber, which are coupled to one another, wherein the first air chamber is coupled to the second air chamber by means of a weld joint, and the second air chamber is coupled to the third air chamber by a further weld joint,
   an overflow area, which Is arranged within the weld joints along a longitudinal axis of the pneumatic element, for pneumatic communication between the first, second, and third air chambers,
   wherein the first, second, and third air chambers each have a first state in which a pressure in the interior of the first, second, and third air chambers corresponds to a pressure outside the first, second, and third air chambers, and have a second state in which the pressure in the interior of the first, second, and third air chambers is greater than the pressure outside the first, second, and third air chambers,
   a flow opening for pneumatic communication between the overflow area and the second air chamber in the first state, and
   in which the profile of at least one of the weld joints has:
   a first area which has a first spacing from the longitudinal axis,
   a second area which adjoins the first area and which has a second spacing from the longitudinal axis,
   a third area which adjoins the second area and which has the first spacing from the longitudinal axis,
   a fourth area which adjoins the third area and which has the second spacing from the longitudinal axis,
   a fifth area which adjoins the fourth area and which has the first spacing from the longitudinal axis,
   a sixth area which adjoins the fifth area and which has the second spacing from the longitudinal axis,
   a seventh area which adjoins the sixth area and which has the first spacing from the longitudinal axis,
   an eighth area which adjoins the seventh area and the first area and which has the second spacing from the longitudinal axis, wherein the first spacing differs from the second spacing.

6. The pneumatic element as claimed in claim 5, in which the profile of at least one of the weld joints is star-shaped.

7. The pneumatic element as claimed in claim 5, in which the profile of at least one of the weld joints is cross-shaped.

8. A pneumatic element for a vehicle seat of a motor vehicle, comprising:
   a first, a second and a third air chamber, which are coupled to one another, wherein the first air chamber is coupled to the second air chamber by means of a weld joint surrounding a first opening having a first shape, and the second air chamber is coupled to the third air chamber by a further weld joint surrounding a second opening having a second shape,
   an overflow area, which Is arranged within the weld joints along a longitudinal axis of the pneumatic element, for pneumatic communication between the first, second, and third air chambers,
   wherein the first, second, and third air chambers each have a first state in which a pressure in the interior of the first, second, and third air chambers corresponds to a pressure outside the first, second, and third air chambers, and have a second state in which the pressure in the interior of the first, second, and third air chambers is greater than the pressure outside the first, second, and third air chambers,
   a flow opening for pneumatic communication between the overflow area and the second air chamber in the first state, and
   the first shape of the first opening surrounded by the weld joint has a profile transversely with respect to the longitudinal axis and the second shape of the second opening surrounded by the further weld joint has a profile transversely with respect to the longitudinal axis, wherein the two profiles differ from each other in order to form the flow opening.

9. The pneumatic element as claimed in claim 8, in which one of the first and second shapes has a circular profile and another one of the first and second shapes has a circular profile, wherein the radius of the profile of the one of the first and second shapes differs from the radius of the profile of the other one of the first and second shapes in order to form the flow opening.

10. The pneumatic element as claimed in claim 8, in which one of the first and second shapes has a cross-shaped profile and another one of the first and second shapes has a circular profile in order to form the flow opening.

* * * * *